(12) United States Patent
Tsai

(10) Patent No.: US 6,986,031 B2
(45) Date of Patent: Jan. 10, 2006

(54) DEVICE AND METHOD FOR PROCESSING A CONTROL ACTION FROM A USER

(75) Inventor: Raymond Tsai, Taoyuan (TW)

(73) Assignee: High Tech Computer, Corp., (TW)

( * ) Notice: Subject to any disclaimer, the term of this patent is extended or adjusted under 35 U.S.C. 154(b) by 570 days.

(21) Appl. No.: 10/202,288

(22) Filed: Jul. 23, 2002

(65) Prior Publication Data

US 2003/0226045 A1    Dec. 4, 2003

(30) Foreign Application Priority Data

May 31, 2002    (TW) ................................. 91111807 A

(51) Int. Cl.
*G06F 9/00*    (2006.01)

(52) U.S. Cl. ........................... 713/1; 713/320; 710/260

(58) Field of Classification Search .................... 713/1, 713/2, 100, 300, 320, 323, 324; 710/260, 710/267
See application file for complete search history.

(56) References Cited

U.S. PATENT DOCUMENTS

| | | | |
|---|---|---|---|
| 4,845,347 A * | 7/1989 | McCrindle et al. | 235/380 |
| 6,243,595 B1 * | 6/2001 | Lee et al. | 455/566 |
| 6,571,343 B1 * | 5/2003 | Johnson et al. | 713/340 |
| 6,711,692 B1 * | 3/2004 | Maeda et al. | 713/324 |

\* cited by examiner

*Primary Examiner*—Dennis M. Butler
(74) *Attorney, Agent, or Firm*—Martine Penilla & Gencarella, LLP

(57) ABSTRACT

A device for processing a control action from a user in an electronic apparatus including a controller and a detection circuit. The controller outputs a voltage signal having a voltage deviation when the user performs the control action to the electronic apparatus. The detection circuit receives the voltage signal and outputs an interrupt signal when the voltage deviation occurs to inform the electronic apparatus the control action.

14 Claims, 5 Drawing Sheets

DEVICE AND METHOD FOR PROCESSING A CONTROL ACTION FROM A USER

BACKGROUND OF THE INVENTION

1. Field of the Invention

The invention relates to a device and method for processing a control action from a user in an electronic apparatus.

2. Description of the Related Art

In the prior art, as shown in FIG. 1, when a user 200 turns on the power of an electronic apparatus 100 (S10), a microprocessor 11 starts to cooperate with a timer 110 (S11). If the timer 110 is up (S12), the microprocessor 11 performs a polling procedure to check whether a voltage deviation is generated via a control bus 13 and an analog/digital converter 12 (S13). The voltage deviation is generated from a controller 14 when the user performs a control action. If the voltage deviation occurs (S14), then the microprocessor 11 executes corresponding control instructions (S15).

In other words, as shown in FIG. 2, when the user 200 presses a button on the controller 14, the controller 14 generates the voltage deviation V1 and outputs this voltage deviation V1 to the analog/digital converter 12. When the microprocessor 11 detects this voltage deviation V1, it executes the corresponding instructions and sends the execution results to a functional module 20 to perform the function requested by the user.

The prior art has the disadvantage that the microprocessor 11 has to performs a polling procedure to check. This wastes system resources and lowers the performance of the microprocessor. This problem becomes more critical when the microprocessor is in a suspend mode, because the timer may periodically wakes the microprocessor up, and speeds up the power consumption.

Therefore, how to automatically detect the occurrence of the voltage deviation to enhance the performance of the microprocessor and to economize the power usage has become an important issue.

SUMMARY OF THE INVENTION

In view of the above, an objective of the invention is to provide a device and method to process a control action from a user, which can enhance the performance of the microprocessor and to economize the power usage of the electronic apparatus.

To achieve the above objective, the device for processing a control action from a user according to the invention includes a controller and a detection circuit. The controller outputs a voltage signal, and the voltage signal has a voltage deviation when the user performs the control action to the electronic apparatus. The detection circuit receives the voltage signal, and outputs an interrupt signal when the voltage deviation occurs to inform the electronic apparatus of the control action and an uninterrupted signal when the voltage deviation does not occur.

In an embodiment, the device according to the invention may have an analog/digital converter signally connected to the controller for converting the voltage signal into a digital signal. The microprocessor of the electronic apparatus may be signally connected to the detection circuit and the analog/digital converter to receive the interrupt signal from the detection circuit and acquire the digital signal from the analog/digital converter.

The detection circuit may include a comparator, a diode, and a capacitor. The diode may be connected to the inverse terminal and the non-inverse terminal of the comparator, so that a forward bias voltage can be established between the inverse terminal and the non-inverse terminal. When applying a reverse bias voltage to the diode after the voltage deviation occurs, the capacitor starts to release its charges until a forward bias voltage is established again between the inverse terminal and the non-inverse terminal.

The uninterrupted signal may have a potential level of logical "1", and the interrupt signal may have a potential level of logical "0".

The invention also provides a method for processing a control action from a user in an electronic apparatus, which outputs a voltage deviation when the user performs the control action; and generates an interrupt signal when the voltage deviation is output. Then, the interrupt signal is sent to the microprocessor to inform the microprocessor the control action.

According to the invention, since the detection circuit will inform the microprocessor when the user performs a control action, the microprocessor will not have to perform the polling procedure. Therefore, the performance of the microprocessor can be effectively enhanced, and the power usage of the electronic apparatus can be economized.

These and other features, aspects and advantages of the invention will become better understood with regard to the following description and accompanying drawings.

DETAILED DESCRIPTION OF THE PREFERRED EMBODIMENT

The device and method according to the preferred embodiment of the invention will be described hereinafter with reference to the accompanying drawings, wherein the same reference numbers refer to the same elements.

Figure 1:
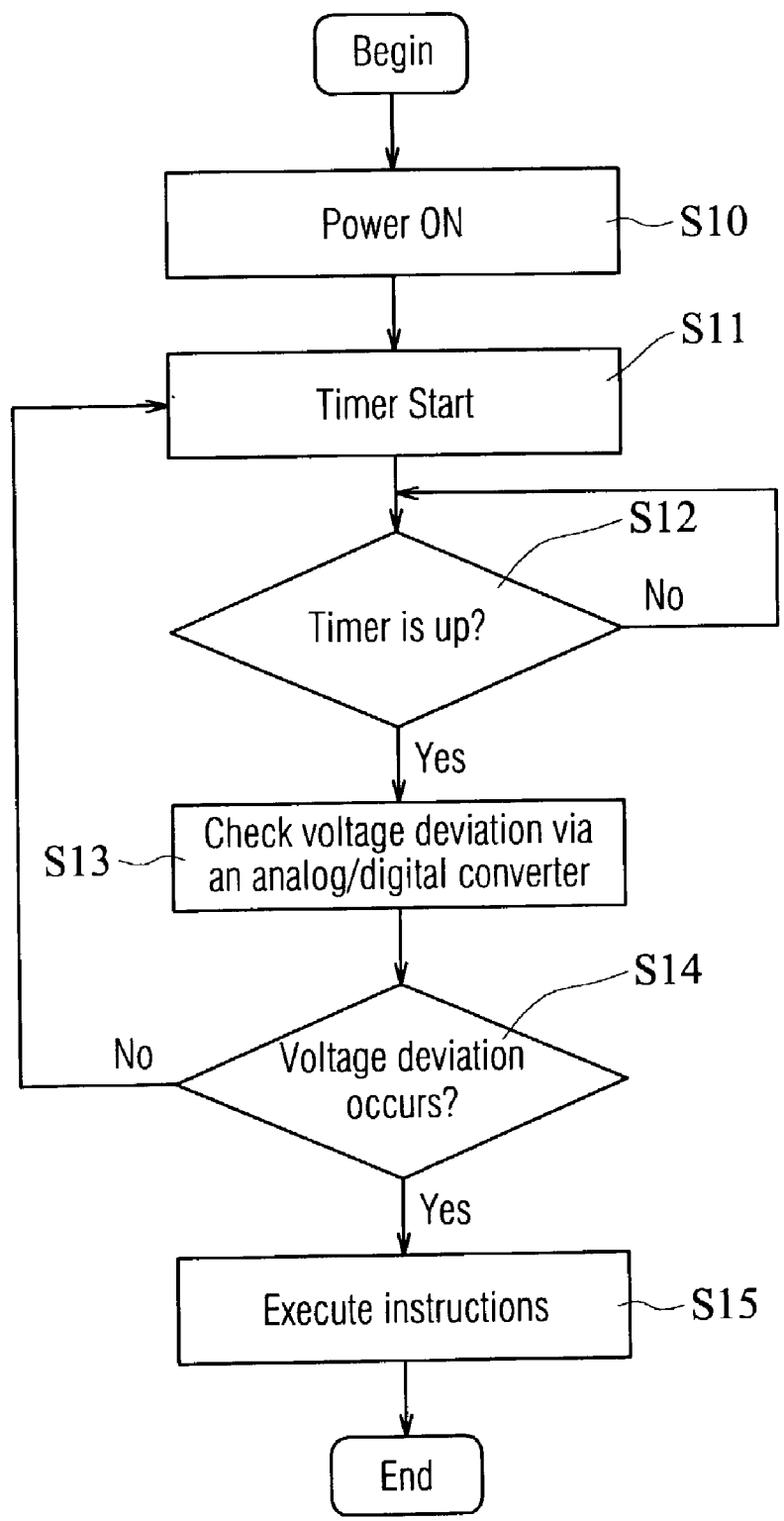
FIG. 1 is a flowchart illustrating the procedure of detecting a voltage deviation in the prior art.
Figure 2:
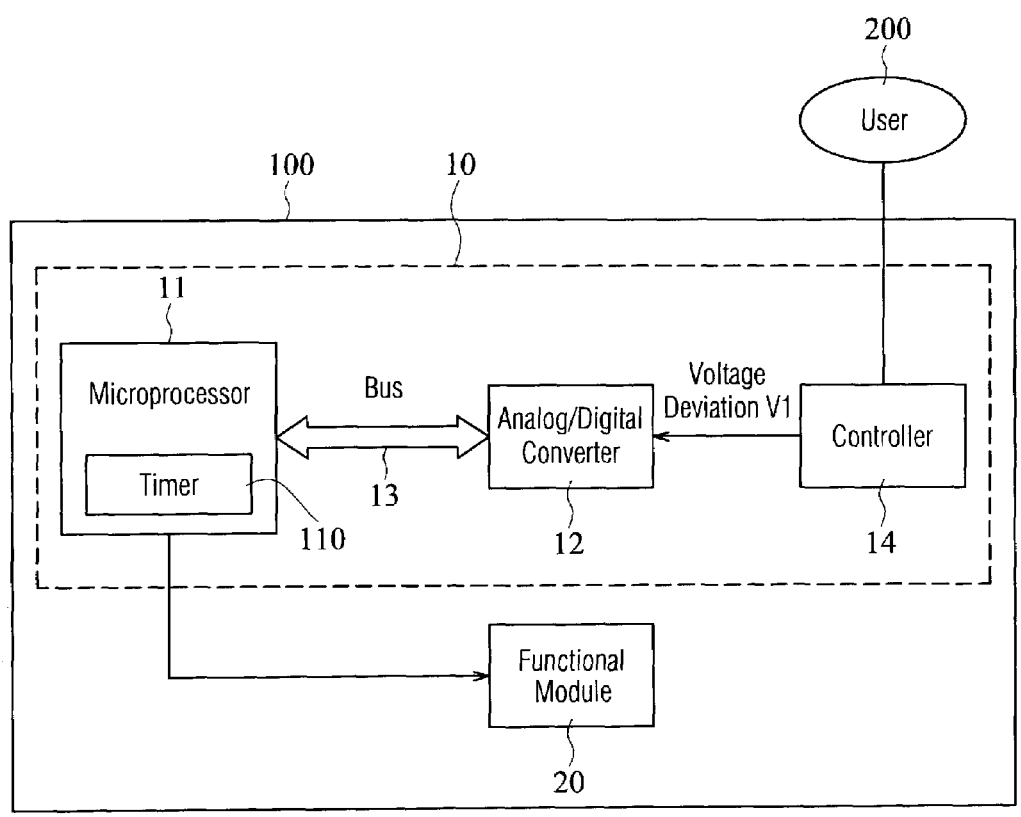
FIG. 2 is a schematic block diagram showing the device for processing the voltage deviation in the prior art.
Figure 3:
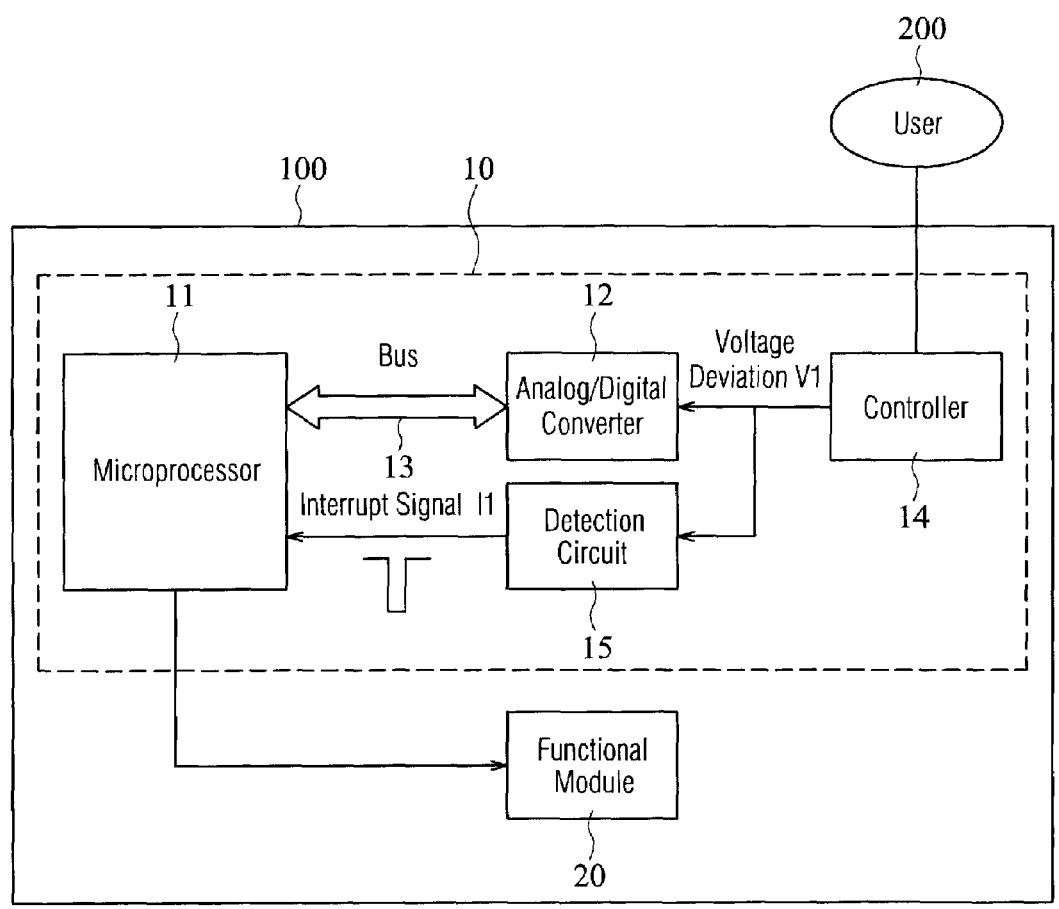
FIG. 3 is a schematic block diagram showing the device for processing a control action from a user according to an embodiment of the invention.

Referring to FIG. 3, a device 10 for processing a control action from a user according to an embodiment of the invention is implemented in an electronic apparatus 100, and includes a controller 14 and a detection circuit 15.

In this embodiment, the controller 14 outputs a voltage signal. When a user 200 performs a control action to the electronic apparatus 100 via the controller 14, the level of the voltage signal has a variation of voltage deviation V1. The detection circuit 15 receives the voltage signal from the controller 14, and outputs an interrupt signal 11 when the voltage deviation V1 occurs to inform the microprocessor the control action.

The device 10 shown in FIG. 3 also includes an analog/digital converter 12, which signally connected to the controller 14 to convert the voltage signal into a digital signal. The microprocessor 11 is signally connected to both the detection circuit 15 and the analog/digital converter 12 to receive the interrupt signal I1 and the digital signal from the analog/digital converter 12.

Figure 4A:
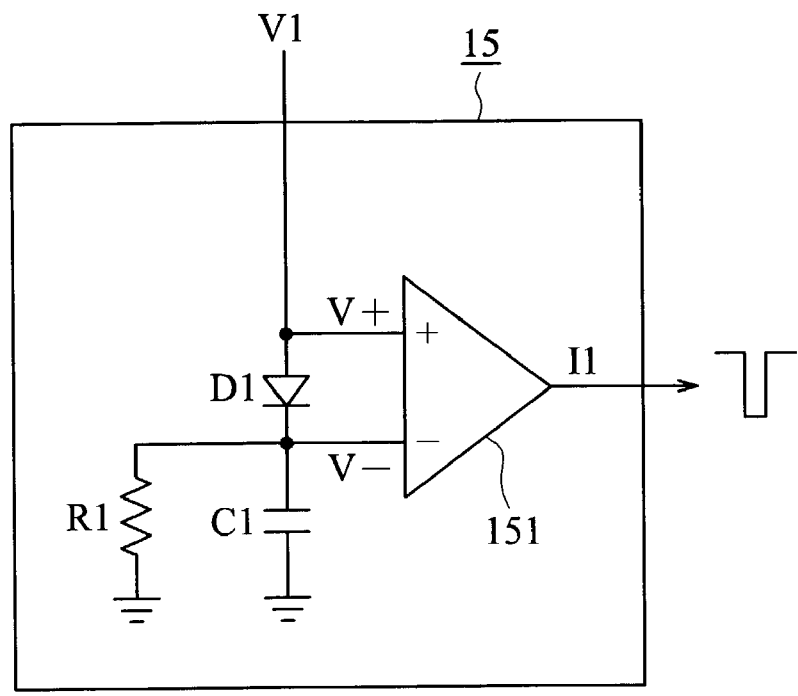
FIG. 4A is a circuit diagram showing an example of the detection circuit.

Referring to FIG. 4A, in an example, the detection circuit 15 may include a comparator 151, a diode D1, a capacitor C1 and a resistor R1. The circuit design of this example is simple and has a low manufacturing cost.

The voltage signal from the controller 14 is transmitted to the non-inverting input terminal V+ of the comparator 151. The diode D1 is connected with the two input terminals of the comparator 151, i.e., the non-inverting input terminal V+ and the inverting input terminal V−, to maintain a forward bias voltage between them. Thus, the non-inverting input terminal V+ and the inverting input terminal V− have a potential difference about 0.2V, and the capacitor C1 is under a charging status. The comparator 151 outputs an uninterrupted signal of a potential level of logical "1" through its output terminal.

When the user 200 performs a control action, such as presses a button, the controller 14 will generate a voltage deviation V1 in a form of a voltage drop. Under this situation, the diode D1 bears an reverse bias voltage, thus the comparator 151 outputs the interrupt signal I1 of a potential level of logical "0". Then, the capacitor C1 immediately releases its charges previously stored, and the diode D1 is applied with a forward bias voltage again. Since the charging time is short, the interrupt signal I1 substantially has a waveform of a pulse signal.

Figure 4B:
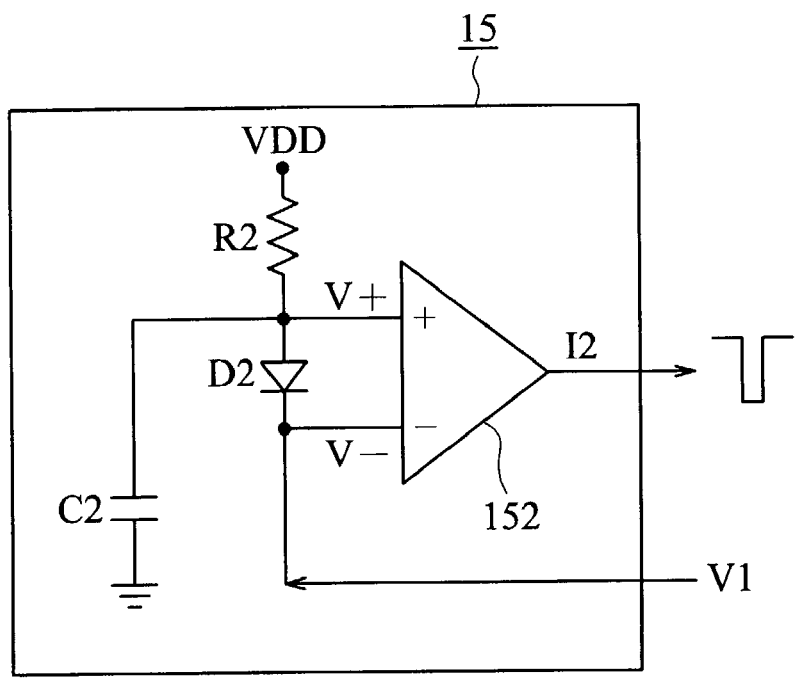
FIG. 4B is a circuit diagram showing another example of the detection circuit.

FIG. 4B shows another example of the detection circuit 15, which includes a comparator 152, a diode D2, a capacitor C2 and a resistor R2.

When the user 200 performs a control action, the controller 14 will generate a voltage deviation V1 in a form of a voltage increase. Under this situation, the diode D2 bears an reverse bias voltage, thus the comparator 151 outputs an interrupt signal I2 of a potential level of logical "0" through its output terminal. Then, the capacitor C2 immediately releases its charges previously stored, and the diode D2 is applied with a forward bias voltage again. Since the charging time is short, the interrupt signal I2 substantially has a waveform of a pulse signal, too.

As shown in FIG. 3, after the interrupt signal I1 or I2 is transmitted to the microprocessor 11, the microprocessor 11 acquires the voltage signal output by the controller 14 from the analog/digital converter 12 via the bus 13. Then, the functional module 20 performs the functions requested by the user, such as searching, playing or stopping playing.

Figure 5:
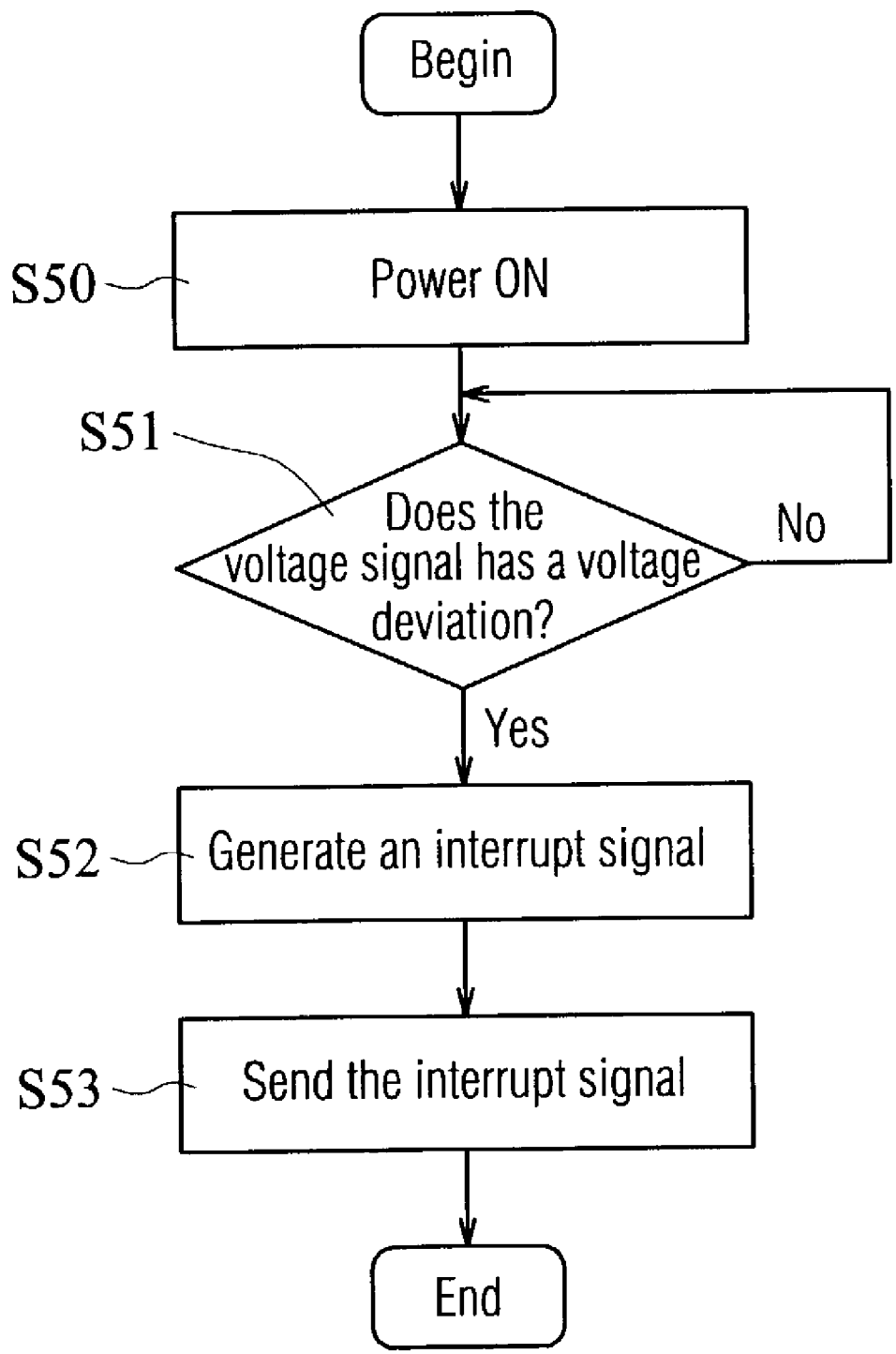
FIG. 5 is a flowchart illustrating the procedure of the method for processing a control action from a user according to an embodiment of the invention.

Referring to FIG. 5, the method for processing a control action from a user according to an embodiment of the invention includes the following steps. After the power of the electronic device is turned on (S50), and when the voltage signal has a voltage deviation V1 (S51), the detection circuit 15 generates an interrupt signal I1 having a pulse shape (S52). The interrupt signal I1 is then sent to the microprocessor 11 to inform the microprocessor the control action (S53).

According to the invention, when the user performs a control action, the detection circuit will inform the microprocessor automatically. Therefore, the microprocessor will not have to perform the polling procedure. The performance of the microprocessor can be effectively enhanced, and the power usage of the electronic apparatus can be economized.

While the invention has been described with reference to a preferred embodiment, this description is not intended to be construed in a limiting sense. Various modifications of the embodiment will be apparent to persons skilled in the art upon reference to the description. It is therefore intended that the appended claims encompass any such modifications.

What is claimed is:

1. A device for processing a control action from a user in an electronic apparatus, comprising:
   a controller for outputting a voltage signal having a voltage deviation when the user performs the control action to the electronic apparatus; and
   a detection circuit for receiving the voltage signal and outputting an interrupt signal when the voltage deviation occurs to inform the electronic apparatus of the control action and an uninterrupted signal when the voltage deviation does not occur, the detection circuit comprising:
      a comparator having an inverse terminal, a non-inverse terminal, and an output terminal;
      a diode connected to the inverse terminal and the non-inverse terminal, so that a forward bias voltage can be established between the inverse terminal and the non-inverse terminal; and
      a capacitor connected to the inverse terminal and the ground,
      wherein when a reverse bias voltage applies to the diode after the voltage deviation occurs, the capacitor starts to release its charges until a forward bias voltage is established again between the inverse terminal and the non-inverse terminal.

2. The device according to claim 1, further comprising:
   an analog/digital converter signally connected to the controller for converting the voltage signal into a digital signal.

3. The device according to claim 2, further comprising:
   a microprocessor signally connected to the detection circuit, the microprocessor receives the interrupt signal from the detection circuit and acquires the digital signal from the analog/digital converter.

4. The device according to claim 1, wherein the forward bias voltage is about 0.2V.

5. The device according to claim 1, wherein the control action includes a press of a button.

6. The device according to claim 1, wherein the uninterrupted signal has a potential level of logical "1".

7. The device according to claim 1, wherein the interrupt signal has a potential level of logical "0".

8. A device for processing a control action from a user in an electronic apparatus, comprising:
   a controller for outputting a voltage signal having a voltage deviation when the user performs the control action to the electronic apparatus; and
   a detection circuit for receiving the voltage signal and outputting an interrupt signal when the voltage deviation occurs to inform the electronic apparatus of the control action and an uninterrupted signal when the voltage deviation does not occur, the detection circuit comprising:
      a comparator having an inverse terminal, a non-inverse terminal, and an output terminal;
      a diode connected to the inverse terminal and the non-inverse terminal, so that a forward bias voltage can be established between the inverse terminal and the non-inverse terminal; and
      a capacitor connected to the non-inverse terminal and the ground,
      wherein when a reverse bias voltage applies to the diode after the voltage deviation occurs, the capacitor starts to release its charges until a forward bias voltage is established again between the inverse terminal and the non-inverse terminal.

9. The device according to claim 8, further comprising:
an analog/digital converter signally connected to the controller for converting the voltage signal into a digital signal.

10. The device according to claim 9, further comprising:
a microprocessor signally connected to the detection circuit, the microprocessor receives the interrupt signal from the detection circuit and acquires the digital signal from the analog/digital converter.

11. The device according to claim 8, wherein the forward bias voltage is about 0.2V.

12. The device according to claim 8, wherein the control action includes a press of a button.

13. The device according to claim 8, wherein the uninterrupted signal has a potential level of logical "1".

14. The device according to claim 8, wherein the interrupt signal has a potential level of logical "0".

* * * * *